(12) United States Patent
Milosev et al.

(10) Patent No.: US 11,912,142 B2
(45) Date of Patent: Feb. 27, 2024

(54) METHOD FOR CHARGING A BATTERY

(71) Applicant: AUDI AG, Ingolstadt (DE)

(72) Inventors: Zika Milosev, Ingolstadt (DE); Nikola Djuric, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 383 days.

(21) Appl. No.: 17/312,618

(22) PCT Filed: Dec. 11, 2019

(86) PCT No.: PCT/EP2019/084603
§ 371 (c)(1),
(2) Date: Jun. 10, 2021

(87) PCT Pub. No.: WO2020/151872
PCT Pub. Date: Jul. 30, 2020

(65) Prior Publication Data
US 2022/0072964 A1 Mar. 10, 2022

(30) Foreign Application Priority Data
Jan. 24, 2019 (DE) ..................... 10 2019 200 872.0

(51) Int. Cl.
B60L 53/10 (2019.01)
B60L 53/67 (2019.01)
(Continued)

(52) U.S. Cl.
CPC ............... B60L 53/10 (2019.02); B60L 53/22 (2019.02); B60L 53/305 (2019.02); B60L 53/67 (2019.02); H05F 7/00 (2013.01)

(58) Field of Classification Search
CPC ........ B60L 53/10; B60L 53/22; B60L 53/305; B60L 53/67; B60L 5/005; B60L 53/30;
(Continued)

(56) References Cited

U.S. PATENT DOCUMENTS 1,119,732 A 12/1914 Tesla
6,534,705 B2 3/2003 Berrios et al.
(Continued)

FOREIGN PATENT DOCUMENTS

CN 2694586 Y 4/2005
CN 101920702 A 12/2010
(Continued)

OTHER PUBLICATIONS

German Examination Report dated Dec. 9, 2020 in corresponding German Application No. 10 2019 200 872.0; 48 pages; Machine translation attached.
(Continued)

Primary Examiner — Stacy Whitmore
(74) Attorney, Agent, or Firm — Maier & Maier, PLLC

(57) ABSTRACT

A method for charging a battery of a vehicle with electrical energy using a charging station which includes at least one source for generating flashes. At least one flash is generated using the at least one source, an amount of electrical energy is provided via the air using the at least one receiver of the vehicle. The received amount of electrical energy is provided to the battery by the at least one receiver.

20 Claims, 2 Drawing Sheets

(51) Int. Cl.
  *B60L 53/22* (2019.01)
  *B60L 53/30* (2019.01)
  *H05F 7/00* (2006.01)
(58) Field of Classification Search
  CPC . B60L 53/32; H05F 7/00; Y02T 10/70; Y02T 10/7072; Y02T 90/12; Y02T 90/14; Y02T 90/16
  See application file for complete search history.

(56) References Cited

U.S. PATENT DOCUMENTS

| | | | |
|---|---|---|---|
| 6,792,259 B1 | 9/2004 | Parise | |
| 2010/0280687 A1* | 11/2010 | Tate, Jr. | B60W 10/26 903/903 |
| 2011/0156494 A1* | 6/2011 | Mashinsky | H02J 50/12 307/104 |
| 2011/0259181 A1 | 10/2011 | Lundquist et al. | |
| 2011/0266995 A1 | 11/2011 | Winfield et al. | |
| 2014/0245916 A1 | 9/2014 | Adler et al. | |
| 2023/0302937 A1* | 9/2023 | Takasaki | G08G 1/0129 701/118 |

FOREIGN PATENT DOCUMENTS

| | | |
|---|---|---|
| CN | 105098892 A | 11/2015 |
| CN | 105846537 A | 8/2016 |
| CN | 106574843 A | 4/2017 |
| DE | 2941986 A1 | 4/1981 |
| DE | 19510780 A1 | 9/1996 |
| DE | 102014214806 A1 | 2/2016 |
| DE | 102014118343 A1 | 6/2016 |

OTHER PUBLICATIONS

International Search Report (with English translation) and Written Opinion (with Machine translation) dated Feb. 10, 2020 in corresponding International Application No. PCT/EP2019/084603; 14 pages.

International Preliminary Report on Patentability dated Feb. 22, 2021 in corresponding International Application No. PCT/EP2019/084603; 11 pages.

Ingenieure.de, "Experiment: Blitz lädt Handy-Akku auf"; Oct. 4, 2013 https://www.ingenieur.de/technik/forschung/experiment-blitz-laedt-handy-akku/ 3 pages; Partial machine translation attached.

Movieclips, "Back to the Future (Oct. 2010) Movie Clip—Back to the Future (1985) HD"; Youtube, Jun. 16, 2011 Retrieved from the Internet: https://www.youtube.com/watch?v=AM5EYO5wWMA 2 pages.

Karla Lant, "Stanford Scientists Are Making Wireless Electricity Transmission a Reality"; Jun. 16, 2017 Retrieved from the Internet: http://futurism.com/stanford-scientists-are-making-wireless-electricity-transmission-a-reality 6 pages.

Office Action dated Nov. 22, 2023, in corresponding Chinese Application No. 201980089963.4, 10 pages.

\* cited by examiner

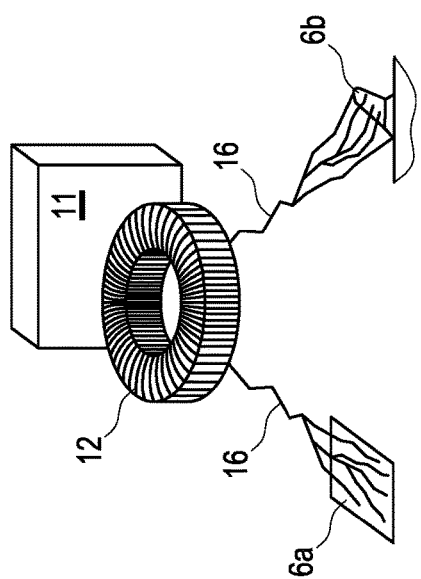
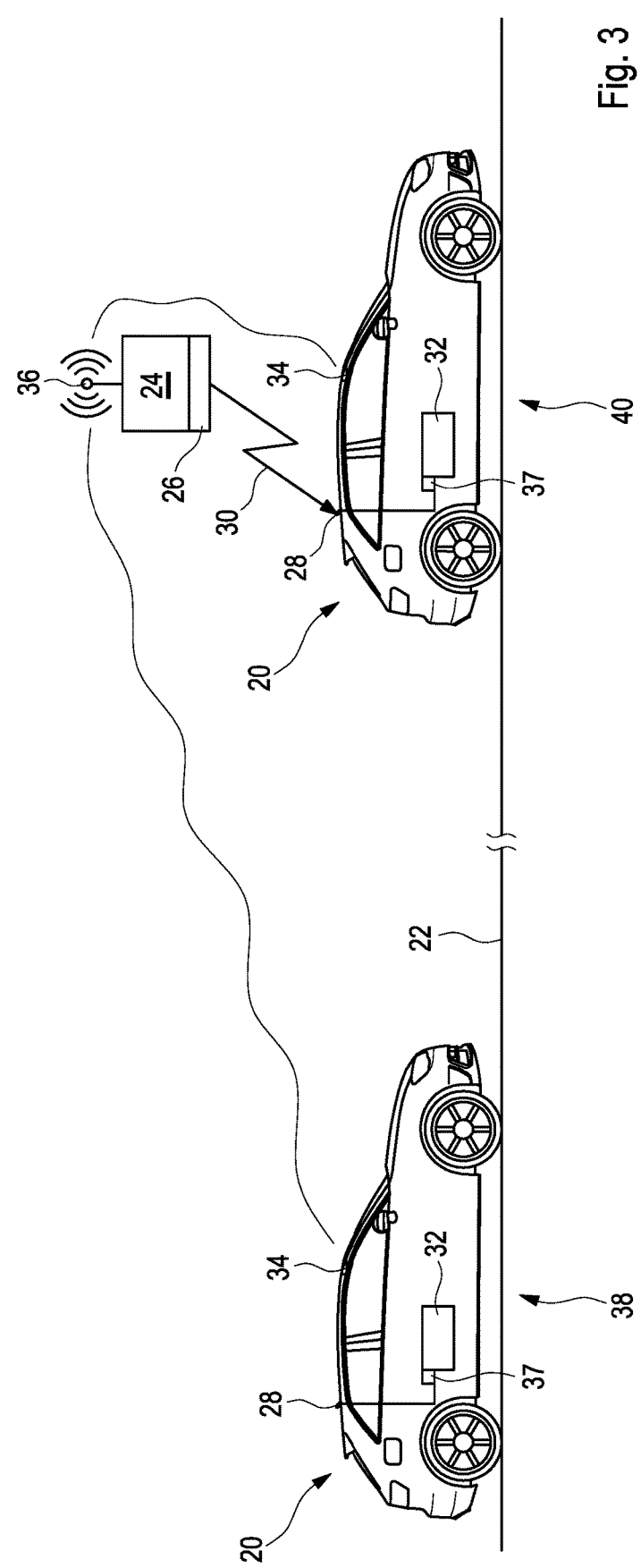

METHOD FOR CHARGING A BATTERY

FIELD

The invention relates to a method for charging a battery of a vehicle and a system for charging a battery of a vehicle.

BACKGROUND

An electrically driven vehicle or electric vehicle requires a longer refilling or charging duration to provide electric energy to a battery of the electrically driven vehicle in relation to a conventional vehicle having internal combustion engine, in the tank of which liquid fuel is to be filled. To reduce a total charging duration for the battery, different concepts are conceivable, in which the battery can be charged in a short time using high currents and/or high voltages. Terms such as rapid charging or ultra-charging, but also further terms are used for such concepts in linguistic use. It is thus conceivable that charging can take place during a journey, similarly to aircraft refueling during a flight, to thus save the customer an unpleasant and long charging duration. Moreover, concepts exist which provide inductive charging.

For a customer or user of an electrically driven vehicle, a journey duration can lengthen by at least 15 minutes due to time-consuming charging. Moreover, suitable infrastructure is presently provided in rudimentary form, wherein an expansion of the infrastructure can still extend over years, whereby the attractiveness of electric vehicles is restricted. Furthermore, vehicle producers are obliged to provide different grid voltages in the respective markets and take into consideration variations.

Document DE 10 2014 118 343 A1 describes a device for a safety system of a vehicle, using which an inductive charging process of an electrical energy accumulator can be carried out.

A method for triggering an explosive substance is described in document US 2011/259181 A1.

A method for discharging electrical energy is known from document US 2014/245916 A1.

Against this background, it was an object to shorten a charging time for charging a battery of a vehicle.

SUMMARY

The method according to the invention is provided for charging a battery of a vehicle with electrical energy using a charging station or from the charging station. The charging station used in this case has at least one source for generating electrical flashes. At least one flash is generated using the at least one source, using which an amount of electrical energy is transported and/or provided via the air to at least one receiver of the vehicle. The at least one flash and/or the amount of electrical energy transported thereby is or are received by the at least one receiver of the vehicle. The amount of electrical energy received by the at least one receiver is provided to the battery of the at least one receiver.

The method is carried out in one embodiment during a journey of the vehicle, for example a motor vehicle or an automobile, when the vehicle passes the at least one source or travels past it, wherein the at least one receiver has at most a defined and/or definable target distance, in particular a first target distance, to the at least one source. The vehicle can be located at a charging position and/or can pass it at a charging time. It is also possible here that the vehicle has a defined or definable maximum target velocity relative to the charging station at the charging time.

Furthermore, it is possible that the charging station is provided, from the vehicle or originating from the vehicle via a communication connection, an item of information about the amount of electrical energy to be provided before generating the at least one flash. This can be carried out at an arrangement time before the charging time when the vehicle is still at an arrangement location, which has a greater distance to the at least one source than the charging location.

If the vehicle is travelling, for example, this is possible when the vehicle approaches the charging station and the at least one receiver still has a distance to the at least one source which is greater, for example multiple times greater, than the definable, in particular first target distance. A respective present distance of the vehicle to the charging station, in particular to the at least one source, can also be ascertained via the communication connection and/or at least one sensor of the charging station. Furthermore, the vehicle, for the battery of which a provided amount of electrical energy is to be provided, can be identified by the charging station when it approaches the at least one source and passes the at least one source during the journey.

The system according to the invention is designed for charging a battery of a vehicle with electrical energy. The system includes a charging station having at least one source for generating electrical flashes. The at least one source is designed to generate at least one flash, which transports an amount of electrical via the air and provides this amount of electrical energy via the air to at least one receiver of the vehicle. The at least one receiver is designed to receive the flash and thus the amount of electrical energy and furthermore to provide the received amount of electrical energy to the battery.

The at least one source for flashes is designed, for example, as a Tesla coil.

The system includes at least one receiver associated with the vehicle, which is arranged on an outer wall of the vehicle and is designed as an antenna, lightning conductor, and/or part of a vehicle body of the vehicle.

In addition, it is possible that the system includes at least one transformer, which is arranged, for example connected, in the vehicle between the at least one receiver and the battery and is designed to transform a value of at least one electrical parameter, for example a current or an amperage and/or voltage, of the at least one amount of electrical energy received by the at least one receiver via the flash, and provide it to the battery. Moreover, the system can include a buffer for access electrical energy. If the amount of electrical energy provided using the at least one flash is excessively large for a storage capacity of the battery, excess energy can be stored in a capacitor as a buffer and charged in the battery later from the capacitor and stored therein, when the battery again has a sufficient storage capacity.

It is conceivable that the system includes a first communication module, which is arranged in the vehicle, and a second communication module, which is associated with the charging station. An exchange of items of information about the amount of electrical energy to be provided and/or required, but also an ascertainment of a present distance between the charging station, for example the at least one source, and the vehicle, which is travelling, for example, or the at least one receiver is possible via the communication modules.

In a further embodiment, the at least one source of the charging station has at most a definable further or second target distance from a roadway, for example from a center line of the roadway which is drivable and/or is driven by the vehicle, wherein the at least one source is arranged adjacent to the roadway or, for example on an infrastructure device, above the roadway.

Using the method, lightning-fast charging of the battery or so-called flash loading is possible. The battery or a battery cell can be charged lightning-fast with electrical energy by very high electrical voltages, which are provided via flashes, and can absorb the high voltages. An implementation of a provided novel battery technology is possible using the method and the system for a vehicle, for example a land vehicle, water vehicle, or air vehicle or aircraft. In the case of a land vehicle, a route drivable by the land vehicle can be bridged as an underlying surface by an arrangement similar to a bridge or tunnel, for example an already existing infrastructure, on which the source is installed, for example the Tesla coil for generating artificial flashes. A further possibility is that an arrangement similar to a tunnel is dispensed with, and the source for the flashes is set up at the edge of the route or the roadway. The charging station can acquire and/or ascertain a charge level of a battery of an approaching vehicle and acquire and/or ascertain a possible necessity to charge the battery by a car-2-X communication via the communication modules of the vehicle and the charging station. The vehicle can absorb an electrical flash generated by the source when passing the charging station and thus the source.

The at least one receiver can be designed as an antenna, which is fastened on the vehicle, for example on an outer wall, for example a roof. Alternatively or additionally, the at least one receiver can be implemented via a vehicle surface and/or via the outer wall, for example a vehicle body, of the vehicle similarly to a Faraday cage having a lightning conductor, wherein the battery is charged via the at least one receiver with the electrical energy, which is provided via the flash.

A payment for the electrical energy provided via the flash can be carried out automatically, wherein, for example, a flat rate or charging "on demand" or on request is possible for the charging.

The charging of the battery of the electrically driven vehicle can thus be carried out during the journey. Investments for a required infrastructure, for example a charging station, can be significantly reduced, since a number of charging columns for the wired supply of a number of vehicles is significantly higher than a number of sources, for example flash coils, for providing flashes for the same number of vehicles. An attractiveness of electric vehicles can significantly increase with the method and the system, since customers do not lose any time for the charging.

Using the method, it is possible to charge the battery during the journey or during a driving state of the vehicle without restrictions for a driver of the vehicle, since his time is not restricted in this way.

It is obvious that the above-mentioned features and the features still to be explained hereinafter are usable not only in the respective specified combination, but also in other combinations or alone, without leaving the scope of the present invention.

BRIEF DESCRIPTION OF THE FIGURES

The invention is schematically illustrated on the basis of embodiments in the drawings and will be described schematically and in detail with reference to the drawings.

FIG. 2 shows a schematic illustration of an example of a source for generating electrical flashes as a component of a first embodiment of the system according to the invention.

FIG. 3 shows a schematic illustration of a second embodiment of the system according to the invention for carrying out a second embodiment of the method according to the invention.

The figures are described in context and comprehensively, identical reference signs are associated with the same components.

DETAILED DESCRIPTION

Figure 1:
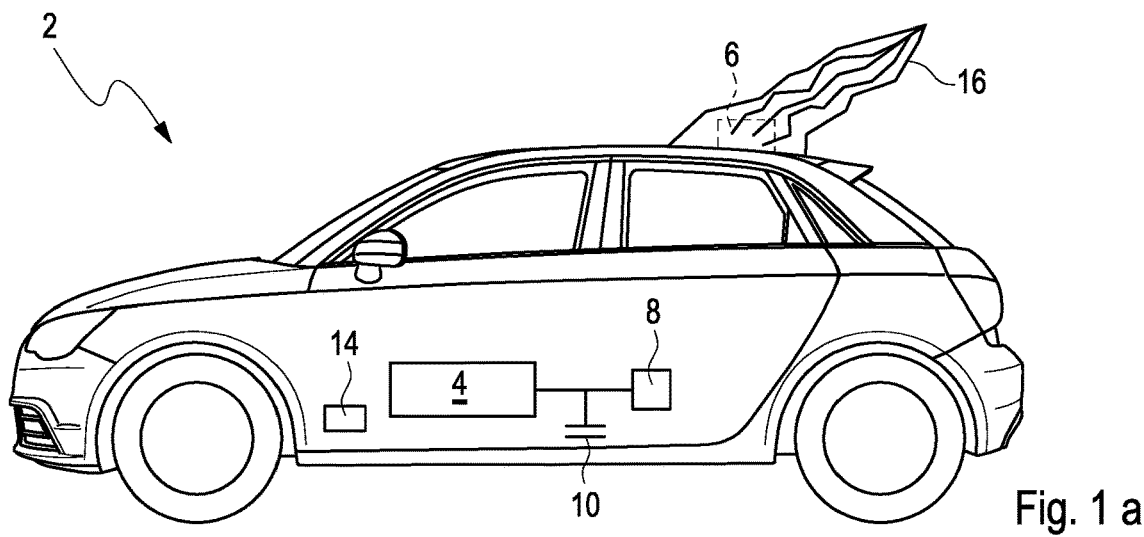
FIG. 1a shows a schematic illustration of a first example of a vehicle having a battery, for which a first embodiment of the method according to the invention is carried out, from a first perspective.
FIG. 1b shows a schematic illustration of a first example of a vehicle having a battery, for which a first embodiment of the method according to the invention is carried out, from a second perspective.
FIG. 1c shows a schematic illustration of a first example of a vehicle having a battery, for which a first embodiment of the method according to the invention is carried out, from a third perspective.
Figure 1:
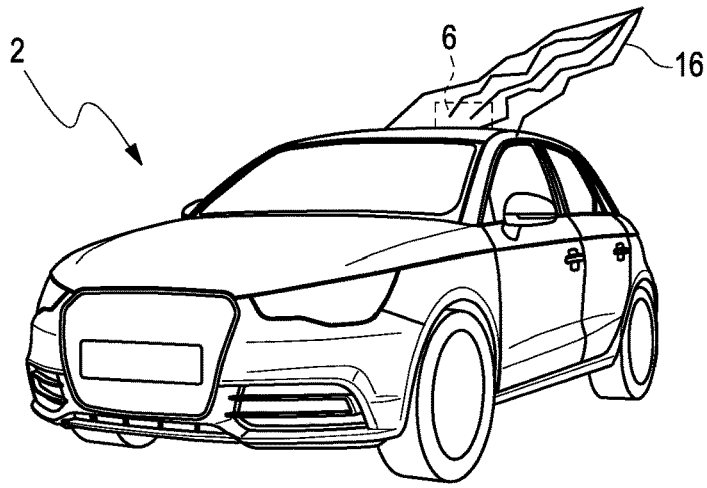
Figure 1:
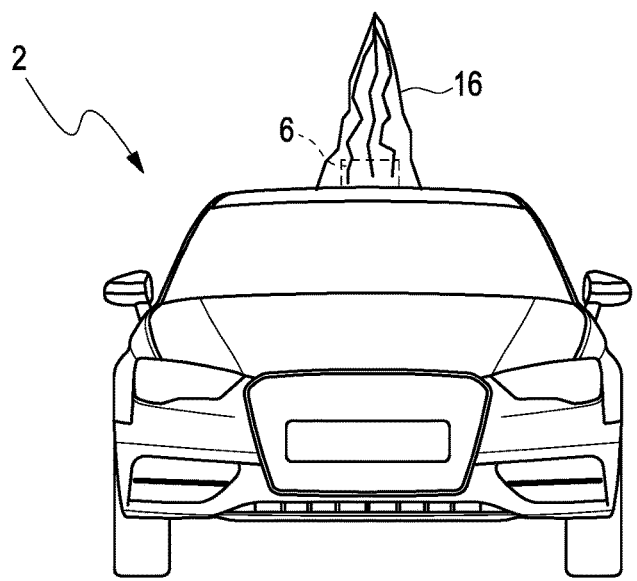

FIGS. 1a, 1b, and 1c show the first example of a vehicle 2 from different perspectives. This vehicle 2, designed here as a motor vehicle, is electrically driven and includes a battery 4, in which electrical energy is stored, which is converted by an electric machine of the vehicle 2 into mechanical energy, wherein the vehicle 2 is driven. A schematically illustrated receiver 6 for electrical flashes 16 is arranged here on a roof and thus on an outer wall of the vehicle 2.

Furthermore, the vehicle 2 also has a transformer 8, a capacitor 10 as an electric buffer, and a control unit 14.

The receiver 6, the transformer 8, the capacitor 10, and the control unit 14 of the vehicle 2 are also designed here as components of the first embodiment of the system according to the invention. Two variants of the receiver 6a, 6b are schematically shown in FIG. 2. Furthermore, a charging station 11 having a source 12 designed as a Tesla coil for generating flashes 16 is shown in FIG. 2, which are designed here as further components of the first embodiment of the system. A first variant of the receiver 6a is designed here as a flat antenna, which is integrated into the outer wall, for example a vehicle body, of the vehicle 2. The second variant of the receiver 6b is designed here as a trapezoidal antenna, for example as a trapezoidal lightning conductor, which is arrangeable, for example, on a roof of the vehicle 2.

In the first embodiment of the method according to the invention, an amount of electrical energy is provided to the battery 4 of the vehicle 2 during a journey of the vehicle 2 by the source 12. If it is ascertained during a journey of the vehicle 2 by the control unit 14 that the battery 4 is to be charged, the control unit 14 of the vehicle 2 makes contact with the charging station 11 of the first embodiment of the system, which also includes the source 12 for the flashes 16. It is communicated to the charging station 11 how much electrical energy is required by the battery 4. Furthermore, a charging time is agreed between the control unit 14 and the charging station 11, at which the receiver 6 and the source 10 are predicted to have at most a target distance from one another. This charging time is dependent at a respective present time on at least one present kinematic parameter of the vehicle 2, for example on its present location or its present position and thus on a present distance between the receiver 6 and the source 10 or a location of the source 10, a present velocity and/or acceleration of the vehicle 2. It is possible that the charging time is updated and adapted during the journey.

As soon as the receiver 6 and the source 12 have at most the target distance from one another at the charging time, when the vehicle 2 travels past the charging station 11, an electrical flash 16 is generated by the source 12 and transmitted to the moving receiver 6. The flash 16 comprises and/or transports the agreed amount of electrical energy. Moreover, at least one electrical parameter, i.e., a voltage and/or a current, is set for the flash 16 by the charging station 11.

The transmitted flash 16 is received by the receiver 6, the voltage and/or the current, as the at least one electrical parameter of the flash 16, is adapted by the transformer 8, wherein the electrical energy of the flash 16 is adapted to the battery 4 and transferred to it. If the provided amount of electrical energy should be excessively large, excess electrical energy can be charged in the capacitor 10 and temporarily stored therein, wherein this electrical energy is transferred at a later time from the capacitor 10 to the battery 4.

FIG. 3 shows the second example of the vehicle 20 at a first time at a first location or at a first position and at a second time after the first time at a second location or at a second position during a journey on an underlying surface or on a roadway 22, while the vehicle 20 approaches from the first time a charging station 24 of the second embodiment of the system according to the invention, which includes a source 26 for electrical flashes 30. The vehicle 20 includes a receiver 28 for flashes 30 designed here as a lightning conductor on its outer wall and an electrical battery 32, which is designed to provide electrical energy for the locomotion of the vehicle 20. Moreover, both the vehicle 20 and also the charging station 24 each have a communication module 34, 36, wherein the vehicle 20 and the charging station 24 communicate via the communication modules 34, 36, which exchange signals via radio.

The vehicle 20 is located at the first time, here an agreement time, on the roadway 22 at an agreement location 38 as the first location. The second location on the roadway 22 is designed and/or to be referred to as the charging location 40, at which the receiver 28 of the vehicle 20 has at most a defined target distance to the source 26 of the charging station. At the agreement time, an amount of electrical energy which is required by the battery 32 is requested at the charging station 24 by the vehicle 20, which is located at the agreement location 38 or at an agreement position. Moreover, in consideration of at least one kinematic parameter of the vehicle 20, a charging time is agreed as the second time, at which the receiver 28 of the vehicle 20 will have at most the target distance to the source 26 at the charging location 40 during a continuation of its journey, wherein the charging time can be continuously updated. As soon as the vehicle 20 has reached the charging location 40 or a charging position at the provided charging time and the receiver 28 has at most the target distance to the source 26, a flash 30 having the agreed amount of electrical energy is generated by the source 26, transported or transmitted to the receiver 28 via the air, and received by the receiver 28. In addition, at least one electrical parameter of the flash 30 is adapted by a transformer 37 to at least one electrical parameter of the battery 32 and the amount of electrical energy of the flash 30 is provided to the battery 32.

In one embodiment of the method, the kinematic parameters of the vehicle, for example its location or velocity, and the electrical parameters of the flash, for example its current and voltage, are taken into consideration. Limiting values of the respective parameters can also be considered here.

LIST OF REFERENCE SIGNS:

2 vehicle
4 battery
6, 6a, 6b receiver
8 transformer
10 capacitor
11 charging station
12 source
14 control unit
16 flash
20 vehicle
22 roadway
24 charging station
26 source
28 receiver
30 flash
32 battery
34, 36 communication module
37 transformer
38 agreement location
40 charging location

The invention claimed is:

1. A method for charging a battery of a vehicle with electrical energy using a charging station, the charging station includes at least one source for generating electrical flashes, wherein at least one flash is generated using the at least one source, using which an amount of electrical energy is provided via the air to at least one receiver of the vehicle, wherein the received amount of electrical energy is provided to the battery by the at least one receiver, wherein an amount of electrical energy is requested at the charging station at an agreement time by the vehicle located at an agreement location, communicating how much electrical energy is required by the battery, wherein a charging time is agreed, at which the receiver of the vehicle will have at most a target distance to the source at a charging location, wherein as soon as the vehicle reaches the charging location at the charging time and the receiver has at most the target distance to the source, the at least one flash having the amount of electrical energy is generated by the source, is transported to the receiver via the air, and is received by the receiver.

2. The method as claimed in claim 1, wherein charging occurs when the vehicle passes the at least one source, wherein the at least one receiver has at most the target distance to the at least one source.

3. The method as claimed in claim 2, wherein the charging station is provided an item of information about the amount of electrical energy to be provided from the vehicle via a communication connection before generating the at least one flash.

4. The method as claimed in claim 1, wherein the charging station is provided an item of information about the amount of electrical energy to be provided to the vehicle via a communication connection before generating the at least one flash.

5. A system for charging a battery of a vehicle with electrical energy, which includes a charging station, which includes at least one source for generating electrical flashes, wherein the at least one source is designed to generate at least one flash, which provides an amount of electrical energy via the air to at least one receiver of the vehicle, wherein the at least one receiver is designed to provide the received amount of electrical energy to the battery, characterized in that an amount of electrical energy is requested at the charging station at an agreement time by the vehicle located at an agreement location, wherein the vehicle communicates how much electrical energy is required by the battery, wherein a charging time is agreed, at which the receiver of the vehicle will have at most a target distance to the source at a charging location, wherein as soon as the vehicle reaches the charging location at the charging time and the receiver has at most the target distance to the source, the at least one flash having the amount of electrical energy is generated by the source, is transported to the receiver via the air, and is received by the receiver.

6. The system as claimed in claim 5, in which the at least one source is designed as a Tesla coil.

7. The system as claimed in claim 6, wherein the at least one receiver is arranged on an outer wall of the vehicle and is designed as an antenna, lightning conductor, and/or part of a vehicle body of the vehicle.

8. The system as claimed in claim 6 wherein at least one transformer is arranged in the vehicle and is designed to transform a value of at least one electrical parameter of the amount of electrical energy received via the flash and to provide it to the battery.

9. The system as claimed in claim 6, wherein a communication module is associated with the charging station, and a further communication module is arranged in the vehicle.

10. The system as claimed in claim 6, wherein the at least one source of the charging station is arranged adjacent to and/or above a roadway for the vehicle.

11. The system as claimed in claim 5, wherein the at least one receiver is arranged on an outer wall of the vehicle and is designed as an antenna, lightning conductor, and/or part of a vehicle body of the vehicle.

12. The system as claimed in claim 11, wherein at least one transformer is arranged in the vehicle and is designed to transform a value of at least one electrical parameter of the amount of electrical energy received via the flash and to provide it to the battery.

13. The system as claimed in claim 11, wherein a communication module is associated with the charging station, and a further communication module is arranged in the vehicle.

14. The system as claimed in claim 11, wherein the at least one source of the charging station is arranged adjacent to and/or above a roadway for the vehicle.

15. The system as claimed in claim 5, wherein at least one transformer is arranged in the vehicle and is designed to transform a value of at least one electrical parameter of the amount of electrical energy received via the flash and to provide it to the battery.

16. The system as claimed in claim 15, wherein a communication module is associated with the charging station, and a further communication module is arranged in the vehicle.

17. The system as claimed in claim 15, wherein the at least one source of the charging station is arranged adjacent to and/or above a roadway for the vehicle.

18. The system as claimed in claim 5, wherein a communication module is associated with the charging station, and a further communication module is arranged in the vehicle.

19. The system as claimed in claim 18, wherein the at least one source of the charging station is arranged adjacent to and/or above a roadway for the vehicle.

20. The system as claimed in claim 5, wherein the at least one source of the charging station is arranged adjacent to and/or above a roadway for the vehicle.

* * * * *